United States Patent Office 3,520,167
Patented July 14, 1970

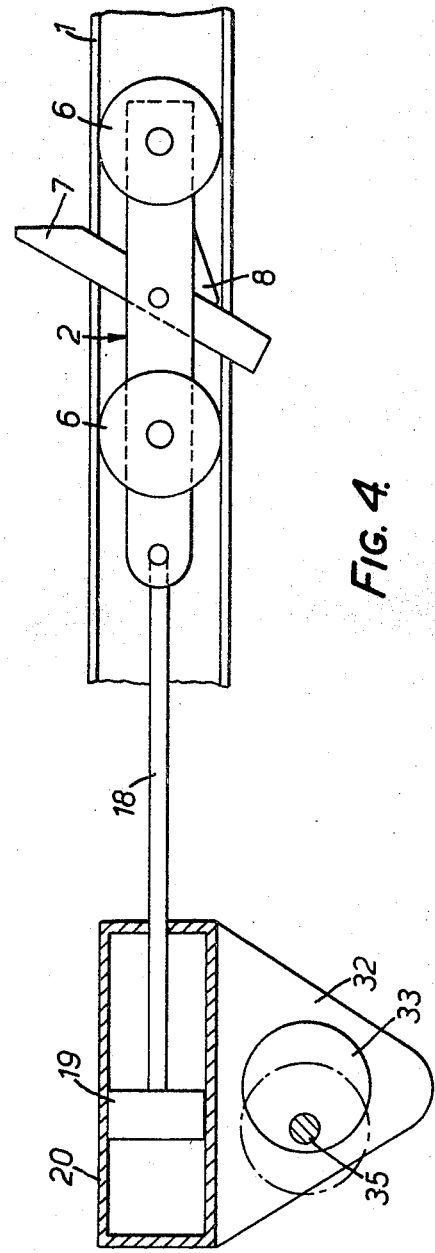

3,520,167
TRANSFER APPARATUS
Ewan Christian Hewitt, Sheffield, England, assignor to Davy and United Engineering Company Limited, Sheffield, England
Filed July 21, 1967, Ser. No. 655,181
Int. Cl. B21b *39/20*
U.S. Cl. 72—252      9 Claims

ABSTRACT OF THE DISCLOSURE

The disclosure relates to transfer apparatus particularly suitable for moving elongate products of a rolling mill to or from a bed which has the facility of displacing the products by sucessively differing amounts. The transfer apparatus has displaceable "ducking dog" means which are reciprocatable and engageable in turn with the products and the displacement of the ducking dog is brought about by at least one constant stroke double-acting piston and cylinder device. The piston of the device is connected by links to the ducking dogs and the cylinder of the device is displaceable relative to the ducking dogs in order to adjust the extent of their displacement.

---

Figure 1:
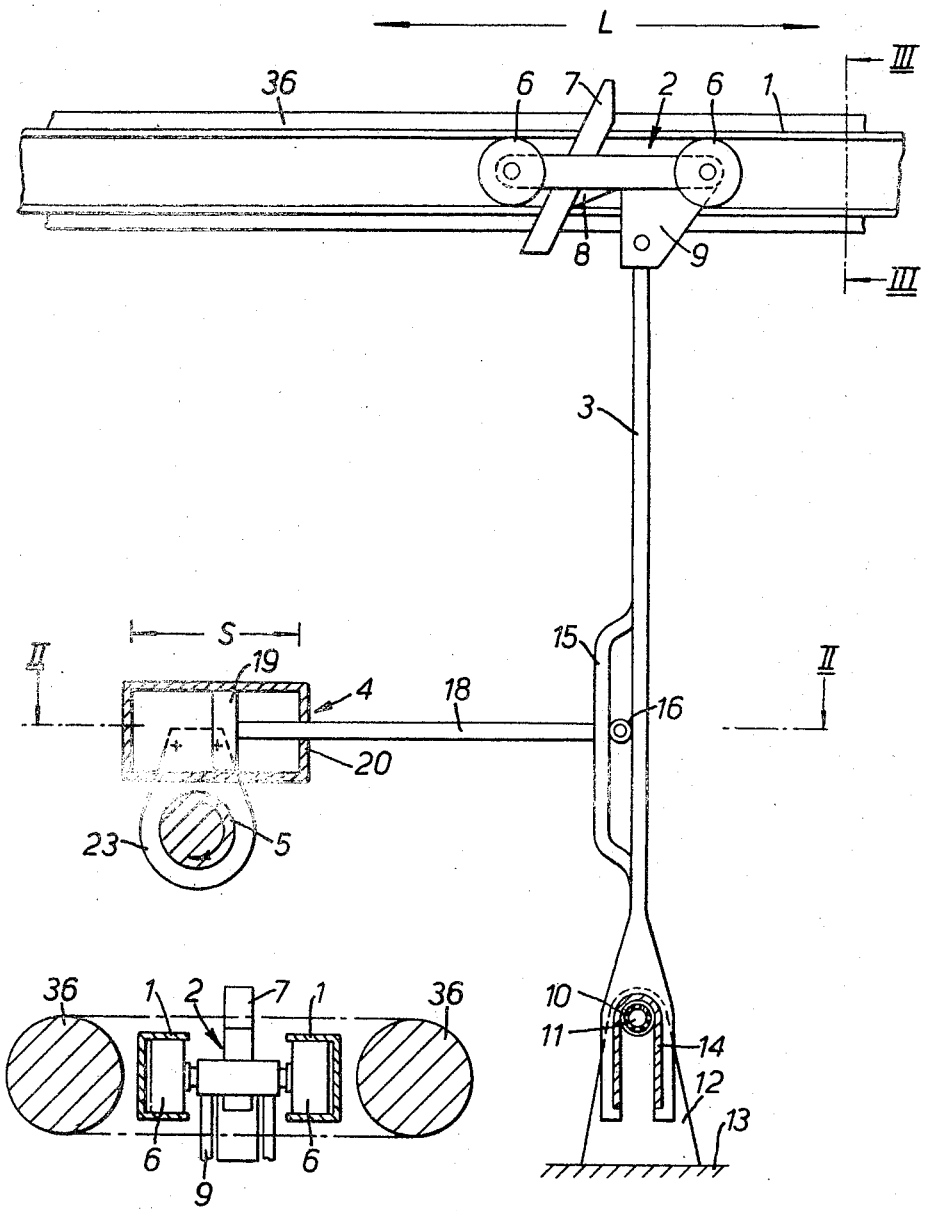

This invention relates to transfer apparatus for moving elongate products of a rolling mill to or from a bed, e.g. a walking beam cooling bed.

Conventional walking beam cooling beds in which products of a rolling mill are advanced by the walking beams across the bed usually operate with a pull-on mechanism which moves the products from an entry roller table onto the bed, and with a pull-off mechanism which will remove the product at the end of the bed onto an exit roller table. These mechanisms have the same cycle time as the walking beams. The cycle time of the beams normally includes a pause after the completion of beam movement.

Since such beds are frequently large and designed to handle high tonnages of products, the weight to be lifted is high and the time taken for a cycle of movement of the walking beams is relatively long. This is satisfactory in many cases.

However, where a bed is fed with products some of which are relatively heavy, and others relatively light, although the heavy ones will tend to arrive on the entry table at sufficiently long intervals of time for the walking beams to be cycled after the arrival of each product, the light ones may arrive at intervals which are much shorter than the walking beams' cycle time, and the products cannot then be transferred successively to the beds. A group of light products will arrive with a short interval of time between each product. There will be a pause and then light products of a further group will arrive. No provision is made on an entry roller table for build-up of products and each needs to be removed before the arrival of the next. A similar difficulty arises in transfer from the bed onto the exit roller table. The present invention overcomes or lessens this difficulty.

According to the invention apparatus for transferring elongate products, e.g. bars, plates and angle sections, of a rolling mill to or from a bed which is movable cyclically for advancing the products is adapted to transfer the products successively to the bed or to transfer the products successively from the bed so that a group thereof is transferred for a single cycle of the bed.

Such an apparatus for transferring products to the bed from an original position can comprise means for moving the products from the original position to the bed which means can be reciprocated to give a stroke which decreases stepwise from a maximum thereof to a minimum, so that the products are positioned successively on the bed, at decreasing distances from the original position, forming a said group, within the time between advancements of the bed, and which stroke is then returned directly to a maximum.

Similarly apparatus for transferring products from the bed to another position can comprise means for moving the products from the bed to the other position which means can be reciprocated to give a stroke which increases stepwise from a minimum thereof to a maximum, so that products are moved successively from positions, in which they form a group on the bed, at increasing distances from the said other position, within the time between advancements of the bed, and which stroke is then returned directly to a minimum.

Thus a group of products can be relatively rapidly loaded onto, or off-loaded from, the bed within the relatively slow time between advancements of the bed. Rapid movement of the transfer apparatus is possible since it can be made relatively light in weight itself and carries the products successively.

The invention includes the said transfer appartus in combination with a bed for cyclically advancing the products. The bed preferably has associated with it both the present entry transfer apparatus and the exit transfer products.

Preferably the said means for moving the products to or from the bed can also be reciprocated to give a constant stroke to cope with a situation in which the interval between the arrival of each product for transfer is not faster than the cylcle time of the bed.

The invention also includes a method for transferring elongate products of a rolling mill to a bed in which the products are transferred successively to the bed or transferred successively from the bed so that a group thereof is transferred for a single cycle of the bed.

Figure 2:
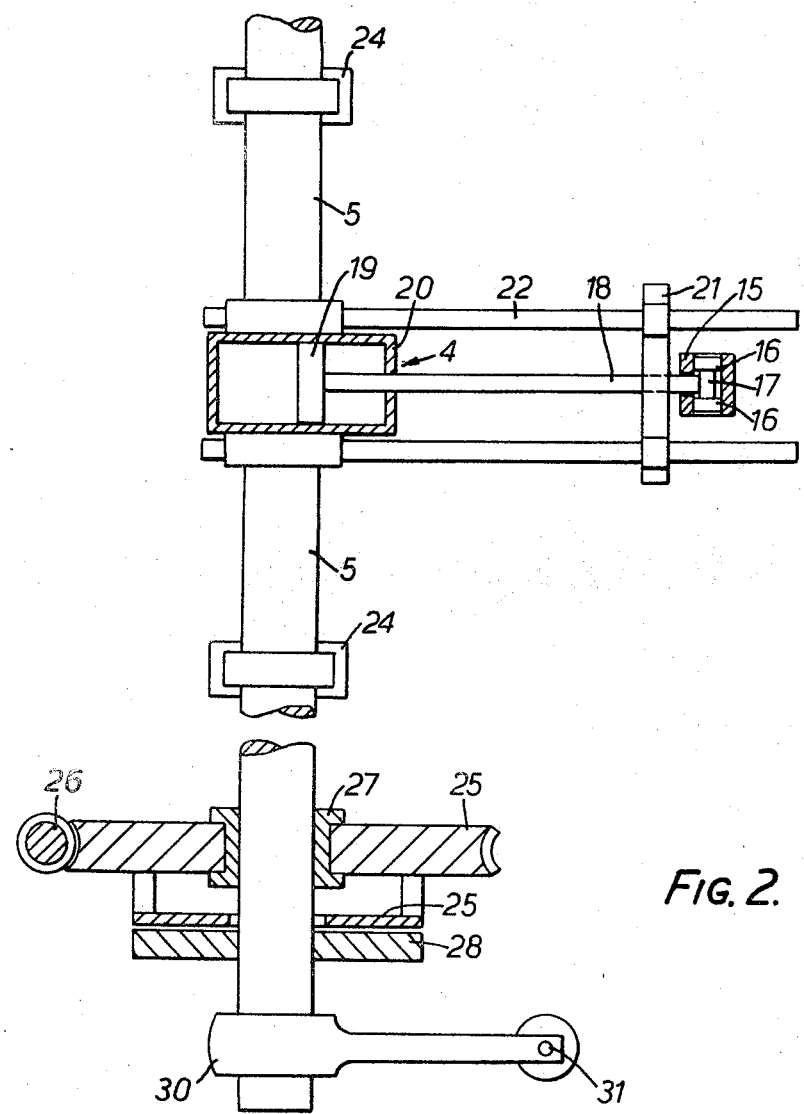

Embodiments of a transfer apparaus of the invention will now be described, by way of example, with reference to the diagrammatic drawings which accompanied the provisional specification and in which:

FIG. 1 is a side view of a transfer apparatus;
FIG. 2 is a cross-section on the line II—II of FIG. 1;
FIG. 3 is a view on the line III—III of FIG. 1; and
FIG. 4 is a side view of a further transfer apparatus.

The apparatus shown is used to transfer elongated products, e.g. bars, plates and angle sections, of a steel rolling mill from a conventional run-on table (not shown) to a conventional walking beam bed (not shown).

The embodiment shown in FIGS. 1 to 3 will be described first. Interspaced between the run-on table are tracks, e.g. tracks 1, for ducking dog units, e.g. unit 2, and the tracks extend between the fixed and walking beams of the cooling bed at the entry side thereof. Each unit is connected to a downwardly extending pivot arm 3 which in turn is connected for movement to a piston and cylinder assembly 4, these asemblies being mounted on a common horizontal shaft 5.

The apparatus will now be described in more detail and as the ducking dog unit, the pivot arms and the piston and cylinder assemblies are repeated for each pair of tracks 1, only one arrangement of each will be described.

The ducking dog unit 2 has wheels 6 which run in the tracks 1 which are channel shaped as can be seen in FIG. 3 and which lie just below the upper surfaces of the rollers 36, of the run-on table and the fixed beams of the bed. The unit is provided with a ducking dog 7 which is pin jointed in it and with a step 8 which prevents anticlockwise turning of the dog from the position shown in FIG. 1, but does not stop clockwise motion thereof.

The arm 3 is pivotally connected to a lower extension plate 9 of the unit 2 and, in the position shown in FIG. 1, is vertically disposed. The lower end of the pivot arm is forked to accept a bearing 10 which is mounted on a fixed shaft 11 which in turn is received in bearings in support blocks, of which block 12 is shown, the support blocks being disposed at either end of the shaft 11 and being anchored to the floor 13. Wear plates 14 are provided in the fork of the arm 3 for contact with the bearing 10.

The pivot arm 3 has a slideaway 15 near its middle portion and running parallel to the main part of the arm. A pair of rollers 16, on a horizontal shaft 17, is free to run along the length of the slideway, but has no freedom of movement laterally thereof.

The horizontal shaft 17 passes through piston rod 18, which is shown in its horizontal position, of the piston and cylinder assembly 4, piston 19 of which slides in cylinder 20. The piston rod 18, at its pivot arm end, passes through, and is fixed to, a cross-head 21 and the cross-head can slide on two guide rods 22 which are rigidly attached to either side of the cylinder 20.

The cylinder 20 is mounted on the horizontal shaft 5 via a pair of lever plates, of which plate 23 is shown, which are keyed to the shaft and each of which is rigidly connected to either side of the cylinder so that turning of the shaft 5 alters the angle of the cylinder 20 to the horizontal. Cylinders, corresponding to the cylinder 20 for each ducking dog unit 2 are mounted at intervals along the shaft 5 which is supported along its length by pedestal bearings, e.g. bearing 24.

The common shaft 5 has driving means to turn it by a small amount. One suitable form of such means is shown in FIG. 2. A worm wheel 25, driven by a worm 26 which is turned by an electric motor (not shown) provided with suitable brake and limit switch arrangements, (not shown), is mounted in a bearing 27 on the shaft 5. A clutch plate 28 is keyed to the shaft and can be caused to engage an associated plate 29, rigidly attached to the worm wheel 25, by conventional means at the appropriate time as hereafter explained, for driving the shaft 5.

The shaft is also arranged to be returned to an original position, as is explained below, by a suitable mechanism which can consist, as shown in FIG. 2, of an arm 30 which is keyed to the shaft 5 and permanently attached at 31 to a preloaded piston and cylinder assembly (not shown).

The manner in which the apparatus functions will now be explained.

The cycle time of the walking beams of the bed may be, for example, 30 seconds plus a pause after the completion of the beams' movement, and light products, e.g. 4" angle sections, may arrive, for example, at 5 second intervals in groups of six onto the run-on table. The apparatus will then be cycled so that a product is removed every 5 seconds from the run-on table, the first product of a group being positioned on the bed 4' from the middle of the entry table, the next product 3'6" from the middle, the next 3' and so on, until the group consisting of six products is positioned on the bed. The walking beams are then moved to advance the group an appropriate distance across the bed. The apparatus then positions a further group on the bed at similarly spaced intervals and the operation is repeated. The number of products within a group is preferably arranged so that a gap between successive rolled pieces allows time for the advancement of the walking beams. Where the rolling frequency is such that no said gap can occur two walking beam beds, each with its own transfer apparatus can be used alternately.

When a product arrives on the run-on table the ducking dog unit will be moved in a direction away from the bed so that the dog 7, on striking the product, will duck under it and then swing back anti-clockwise until it abuts the stop 8. The unit may alternatively already be in its furthest position from the bed prior to the arrival of the product on the run-on table. The dog can then be moved toward the bed pushing the product with it firstly on the rollers of the entry table and then on the fixed beams of the bed. Having reached the position to be taken up by the product on the bed, the unit is returned to the run-on table to transfer a further product to a position somewhat nearer the run-on table until the group has been transferred. Then the walking beams lift the group up to advance it and, after the advancement has been completed, the operation of the unit is continued. It will therefore be appreciated that the stroke of the apparatus must first be a maximum, then be stepwise reduced to a minimum, then returned directly to a maximum and so on.

The control of the stroke of the apparatus will now be expalined.

The piston and cylinder assembly 4 has a fixed stroke and when the piston rod 18 moves forward or backwards it causes the top of the pivot arm 3 to move to the right held on a horizontal course by the lower extension plate 9 and its lower end turning about the bearing 10 and at the same time moving upwardly or downwardly on it. Thus the ducking dog unit 2 is moved to the right or left by the pivot arm.

Clearly if the rollers 16 are at the bottom of the slideway 15 the stroke will be a maximum and as the rollers are brought up the slideway the stroke gets smaller until it is a minimum with the rollers at the top. The apparatus is arranged so that products are positioned on the run-on table so that they begin to be pushed by the unit 2 when the pivot arm 3 is vertical as shown in FIG 1, or somewhat to the left, in the figure, of the vertical. That part of the movement of the unit behind the product when the unit is out of contact with the product will, of course, be non-effective and when the term "stroke" is used herein it refers only to the operative part of the entire stroke.

In order to alter the position of the rollers 16 in the slideway, the shaft 5 is turned, to alter the angle of the piston and cylinder assembly 4 after each stroke, by the electric motor through the worm wheel 25 and the worm 26 with the clutch engaged. As soon as the necessary number of stepwise decreasing strokes has been completed, the group of products having been positioned on the bed, the clutch is temporarily disconnected and the arm 30, in its permanently loaded condition, then returns the shaft directly to its original position to give rise to a maximum stroke once more and the clutch is re-engaged.

The embodiment shown in FIG. 4 will now be described. Parts of this apparatus which are similar to those of FIGS. 1 to 3 have similar reference numerals.

The ducking dog unit 2 of this embodiment is directly connected to the piston rod 18 and each side of the cylinder 20 is rigidly attached to, and the piston and cylinder assembly is thus carried by, a pair of support plates of which plate 32 is shown. A common shaft 35 has keyed to it a pair of eccentrics, of which eccentric 33 is shown, each operating on a support plate. The shaft 35 is turnable in the same way as shaft 5 in FIG. 1, and carries, of course, a plurality of pairs of support plates for the various cylinders.

The stroke, i.e. the operative part of the whole stroke, is changed by turning the shaft 35 which moves the piston and cylinder assembly 4 bodily by way of the eccentric, either toward or away from the bed so that the centre of the overall stroke, i.e. including the ineffective part, is moved either toward or away from the bed.

It will be appreciated that the apparatus in the drawings can be used for transferring products of a group from the bed to an exit roller table merely by arranging that the stroke is stepwise increased from the minimum to the maximum, i.e. that the apparatus will remove first the product nearest the exit roller table and lastly the product farthest from the exit table.

The apparatus, shown in the drawings, can equally well be used for transferring products from a turn-over unit onto the walking beam bed, a conventional pull-on mechanism operating from the entry roller table to the turn-over unit. In such an application the turn-over gear could be used for turning up beams for promoting uniform cooling, but would not be used for other products such as angle sections. When the turn-over unit is in use, its cycle time is likely to correspond with that of the walking beam bed and in such circumstances the transfer apparatus would be used with a constant stroke rather than one which varies stepwise.

Although the invention has been discussed in particular relation to transfer apparatus which slides the products to move them, apparatus of the invention can equally well be arranged to lift the products and set them down without sliding.

In accordance with the provisions of the patent statutes, I have explained the principle and operation of my invention and have illustrated and described what I consider to represent the best embodiment thereof.

I claim:

1. Apparatus for displacing in turn a plurality of elongate members by successively differing amounts comprising displaceable means reciprocatable to give a stroke in the required direction of movement of the members and engageable in turn with the members, at least one constant stroke fluid operated double-acting piston and cylinder means, link means connecting the piston of the piston and cylinder means and the displaceable means so that operation of the piston and cylinder means displace the displaceable means, and means for stepwise moving the cylinder relative to the displaceable means to adjust the stroke of the displaceable means.

2. Apparatus for transferring elongate products of a rolling mill from an original position to a bed which is movable cyclically for advancing the products, said apparatus comprising displaceable means reciprocatable to give a stroke in the required direction of movement of the products and engageable in turn with the products, at least one constant stroke fluid operated double-acting piston and cylinder means, link means connecting the piston of the piston and cylinder means and the displaceable means so that operation of the piston and cylinder means displaces the displaceable means, and means for stepwise moving the cylinder relative to the displaceable means to adjust the stroke of the displaceable means so that the products are positioned successively on the bed at decreasing distances from the original position.

3. Apparatus according to claim 15 in which the displaceable means comprise a plurality of ducking dog units connected for synchronous movement.

4. Apparatus according to claim 3 having an hydraulic piston and cylinder assembly for each ducking dog unit to impart reciprocal movement thereto, and reset means for returning the cylinders to their original position.

5. Apparatus according to claim 4 in which the cylinders are mounted on a common shaft so that they move relative to the units from the initial position on movement of the shaft, the shaft being driven by a worm and worm wheel through a clutch, the reset means comprising means for permanently biasing the shaft for returning it to the initial position.

6. Apparatus accoring to claim 4 in which the cylinders are each mounted through an eccentric on the shaft so that they move toward or away from the unit for stepwise increasing or decreasing the stroke respectively on movement of the shaft.

7. Apparatus according to claim 4 in which the cylinders are each mounted through a carrier on the shaft so that they turn on movement of the shaft and the ducking dog units are each moved through an arm extending downwardly therefrom and pivotally connected thereto and to the piston of the associated piston and cylinder assembly so that the stroke is increased or decreased on turning the shaft.

8. Apparatus according to claim 2 in combination with a walking beam cooling bed.

9. Apparatus for transferring elongated products of a rolling mill from a bed which is movable cyclically for advancing the products to another position, said apparatus comprising displaceable means reciprocable to give a stroke in the required direction of movement of the products and engageable in turn with the products, at least one constant stroke fluid operated double-acting piston and cylinder means, link means connecting the piston of the piston and cylinder means and the displaceable means so that operation of the piston and cylinder means displaces the displaceable means and means for stepwise moving the cylinder relative to the displaceable means to adjust the stroke of the displaceable means so that the products are moved successively to said other position from positions on the bed at increasing distances from said other position.

References Cited

UNITED STATES PATENTS

| | | | |
|---|---|---|---|
| 364,392 | 6/1887 | Bailey | 198—33 |
| 850,190 | 4/1907 | Stevens | 198—24 |

CHARLES W. LANHAM, Pimary Examiner

M. J. KEENAN, Assistant Examiner

UNITED STATES PATENT OFFICE
CERTIFICATE OF CORRECTION

Patent No. 3,520,167　　　　　　　　　　　　　　　July 14, 1970

Ewan Christian Hewitt

It is certified that error appears in the above identified patent and that said Letters Patent are hereby corrected as shown below:

Column 2, line 31, "cylcle" should read -- cycle --; line 68, "step" should read -- stop --. Column 4, line 15, "expalined" should read -- explained --. Column 5, line 48, "claim 15" should read -- claim 2 --.

Signed and sealed this 23rd day of February 1971.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents